W. G. Savage,
Rotary Steam Valve.
Nº 79,863. Patented July 14, 1868
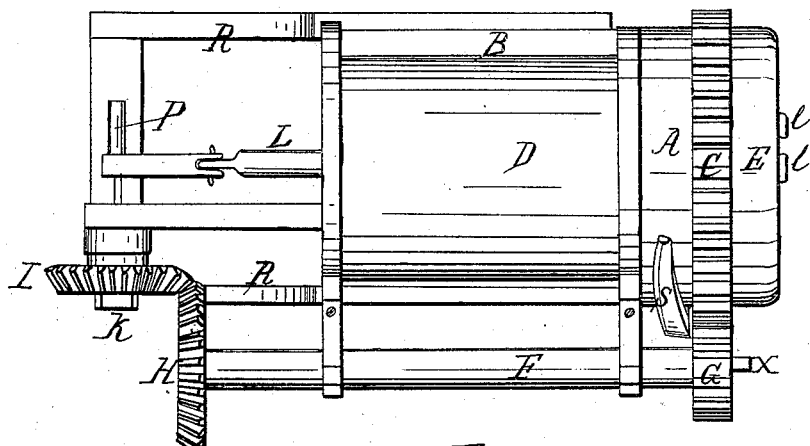
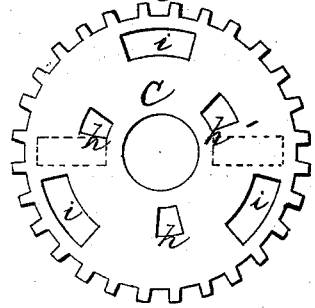
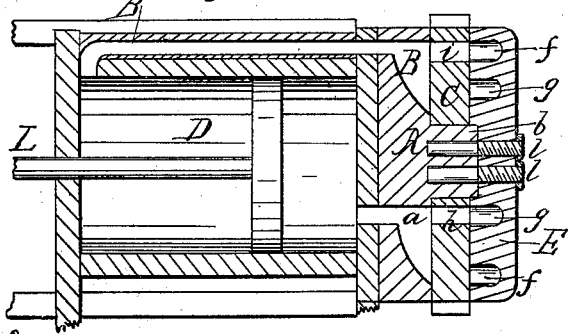
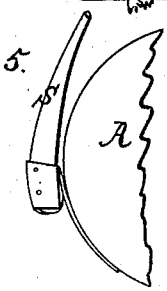
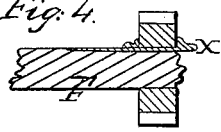
Witnesses,
Inventor,
W. G. Savage
Per Alexander Mason
Attys

United States Patent Office.

W. G. SAVAGE, OF KNOXVILLE, IOWA.

Letters Patent No. 79,863, dated July 14, 1868.

---

IMPROVEMENT IN STEAM-ENGINES.

---

The Schedule referred to in these Letters Patent and making part of the same.

---

TO ALL WHOM IT MAY CONCERN:

Be it known that I, W. G. SAVAGE, of Knoxville, in the county of Marion, and in the State of Iowa, have invented new and useful Improvements in Steam-Engines; and I do hereby declare that the following is a full, clear, and exact description thereof, reference being had to the accompanying drawings, and the letters of reference marked thereon.

In the annexed drawings, making a part of this specification, R represents a frame of any required dimensions, upon which is secured, in any ordinary or convenient manner, the cylinder D.

The cylinder D has two main ports leading through its back head, A, to the opposite ends thereof, one extending along the outside, as seen at B, and one passing directly through the head A into the cylinder D, as seen at $a$.

The mouths of these ports B and $a$ are elongated from centre to circumference of the head A, as shown in Figure 2 of the drawings, so as to receive or exhaust the steam, by means of the ports $h$ and $i$ of the revolving valve C.

Secured to or forming a part of the head A, is a suitable hub, $b$, on which the movable valve C revolves, and from which project bolts $l\,l$, which secure the double steam-chest E.

C represents a movable circular valve, provided with a hole in its centre to fit and work on the hub $b$, and with cogs on its periphery, by which it is operated by means of the cog-wheel G, with which said valve-cogs mesh. The valve C is made with two series of holes or ports, $h$ and $i$, the ports $h$ being the receiving-ports and $i$ the exhausting-ports. Any desired number of ports may be used, according to the size of the valve, one port in each series being exactly opposite one port of the other series. When the receiving-ports $i$ pass over either of the main ports, $a$ or B, in the head A, the exhaust-ports $h$ of the valve pass over the mouth of the other main port, and so on through the whole set.

Thus it will be seen that when the steam passes into one of the main ports it is allowed to escape through or from the other.

The valve C is ground, so as to make a perfect steam fit between the head A and steam-chest E. The said double steam-chest E is made circular, of size equal to the valve C, and is bolted to the hub $b$ by means of bolts $l\,l$. This double chest is made by cutting away from the face-side two grooves, $g$ and $f$. As shown in the drawings, the groove $g$ is the receiving-chest, and has a pipe leading into it, and is covered a part of the way around, leaving two ports on opposite sides, so as to obviate unnecessary pressure and friction on and of the valve C. The groove $f$ is the exhaust-chest, and has a suitable hole leading therefrom, through which the steam may escape.

L represents the piston-rod, which connects with and operates the crank P on the end of the horizontal shaft K. Said shaft K is secured or adjusted in the frame R in any suitable manner, and has the crank P secured to one end thereof, and cog-wheel I to the other end.

F represents a longitudinal horizontal shaft, adjusted on the frame R parallel with the cylinder D, and has secured cog-wheel H at one end, which meshes with and is operated by the wheel I, and at the other end an adjustable cog-wheel, G, which meshes with and operates the valve C.

The shaft F has a suitable groove, in which is secured a small spring, $x$, which catches in a notch in the hole of the wheel G, and keeps the same from turning. The spring $x$ is provided with suitable shoulders to keep said wheel G from slipping on its shaft longitudinally.

It will be seen that as soon as the steam is admitted into the cylinder D the piston-rod operates the shaft K, which in turn operates the shaft F, and the wheel G thereof turns the valve C, and by means of its ports $h$ and $i$ the steam is admitted and exhausted alternately in the ends of the cylinder D.

S represents a spring-lever secured to the side of the head A, and is designed to operate on the spring $x$ and press it out of gear with the wheel G, and thereby allow the shaft F to turn half around, when said spring $x$ catches in another groove in the opposite side of the wheel G, and starts it forward again, and it in turn starts the valve C. When the valve C commences its motion the piston and crank must of necessity move the other, and thus, by this very simple device, motion is reversed; and it will be seen that my valve may be used on locomotive-engines as well as stationary ones.

Having thus fully described my invention, what I claim as new, and desire to secure by Letters Patent, is—

1. The arrangement of the lever S and spring $x$ with the shaft F and wheel G, by which means the motion of the engine is reversed, substantially as set forth.

2. The combination of the valve C with the head A, having a hub, $b$, and the cylinder D, with its steam-spaces B $a$, constructed and operating substantially as specified.

In testimony that I claim the foregoing, I have hereunto set my hand and seal, this 21st day of January, A. D. 1868.

W. G. SAVAGE. [L. S.]

Witnesses:
H. B. KEEFER,
A. B. MILLER.